US010108980B2

(12) United States Patent
Morris et al.

(10) Patent No.: US 10,108,980 B2
(45) Date of Patent: Oct. 23, 2018

(54) METHOD AND APPARATUS FOR TARGETED ADVERTISING

(75) Inventors: Nadia Morris, Decatur, GA (US);
Andrea Basso, Marlboro, NJ (US);
Tara Hines, New York, NY (US);
Aleksey Ivanov, Atlantic Highlands, NJ (US); Jeffrey Mikan, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 159 days.

(21) Appl. No.: 13/167,998

(22) Filed: Jun. 24, 2011

(65) Prior Publication Data

US 2012/0330756 A1 Dec. 27, 2012

(51) Int. Cl.
*G06Q 30/00* (2012.01)
*G06Q 30/02* (2012.01)
*G06Q 50/00* (2012.01)

(52) U.S. Cl.
CPC ..... *G06Q 30/0251* (2013.01); *G06Q 30/0255* (2013.01); *G06Q 50/01* (2013.01); *H04M 2215/0192* (2013.01)

(58) Field of Classification Search
CPC ............... G06Q 50/01; G06Q 30/0239; G06Q 30/0641; G06F 1/163; G06F 3/017; G06T 11/60; G06T 2207/10016; G06T 2207/20224; G06T 7/251; H04L 67/10; H04L 67/22; H04N 21/435;
(Continued)

(56) References Cited

U.S. PATENT DOCUMENTS 5,794,210 A * 8/1998 Goldhaber et al. ........ 705/14.69
6,282,713 B1 8/2001 Kitsukawa
(Continued)

FOREIGN PATENT DOCUMENTS

KR 20030037130 5/2003
WO WO 00179453 * 12/2000 ............. G06F 17/60

OTHER PUBLICATIONS

Spring, Martin et al., "Service, services and products: rethinking operations strategy", Lancaster University Management School, Lancaster, UK, International Journal of Operations and Production Management, vol. 29, No. 5,, 2009, pp. 444-467.

*Primary Examiner* — Fonya M Long
*Assistant Examiner* — Rashida R Shorter
(74) *Attorney, Agent, or Firm* — Guntin & Gust, PLC; Matthew Tropper

(57) ABSTRACT

A system that incorporates teachings of the present disclosure may include, for example, a controller operable to determine a behavioral pattern of at least one of a subscriber leader and a plurality of subscriber followers who track activities of the subscriber leader. The controller can be further operable to detect a first request to transmit first media content from a first device of a first plurality of devices of the subscriber leader to a second plurality of devices of the plurality of subscriber followers, identify in the first media content a first substitutable advertisement product, substitute the first substitutable product in the first media content with a first advertisement product selected according to the determined behavioral pattern to generate updated first media content, and transmit the updated first media content to the second plurality of devices of the plurality of subscriber followers. Other embodiments are disclosed.

20 Claims, 6 Drawing Sheets

(58) Field of Classification Search
CPC ............ H04N 21/4532; H04N 21/812; H04N 21/47815; H04N 21/8133; H04N 5/23251; H04N 7/18; H04N 7/181; H04N 7/188; G06K 9/00335
USPC .................................................. 705/14.66, 14
See application file for complete search history.

(56) References Cited

U.S. PATENT DOCUMENTS

| | | | |
|---|---|---|---|
| 6,968,006 | B1 | 11/2005 | Puri et al. |
| 7,000,242 | B1 | 2/2006 | Haber |
| 7,149,710 | B1 | 12/2006 | Edmark |
| 7,269,643 | B2 | 9/2007 | Spaid |
| 7,293,280 | B1 | 11/2007 | Gupta |
| 7,444,659 | B2 | 10/2008 | Lemmons |
| 7,925,743 | B2 | 4/2011 | Neely |
| 8,010,986 | B2 | 8/2011 | Bove, Jr. et al. |
| 8,386,317 | B2 | 2/2013 | Brown et al. |
| 8,424,052 | B2 | 4/2013 | Abed |
| 8,635,674 | B2 * | 1/2014 | Bhatia .................. H04N 21/252 725/10 |
| 8,762,850 | B2 * | 6/2014 | Matz ................ G06F 17/30867 715/723 |
| 8,910,201 | B1 | 12/2014 | Wright et al. |
| 9,113,040 | B2 * | 8/2015 | Beyabani ............... G06Q 30/02 |
| 9,143,565 | B2 | 9/2015 | Hensgen et al. |
| 2002/0083469 | A1 | 6/2002 | Jeannin |
| 2002/0162120 | A1 | 10/2002 | Mitchell |
| 2003/0020744 | A1 | 1/2003 | Ellis et al. |
| 2003/0028873 | A1 | 2/2003 | Lemmons et al. |
| 2003/0033192 | A1 | 2/2003 | Zyman |
| 2004/0019524 | A1 | 1/2004 | Marshall |
| 2004/0116183 | A1 * | 6/2004 | Prindle ............................ 463/42 |
| 2004/0167814 | A1 | 8/2004 | Hawks |
| 2004/0249700 | A1 | 12/2004 | Gross et al. |
| 2005/0021398 | A1 | 1/2005 | McCleskey et al. |
| 2005/0229227 | A1 | 10/2005 | Rogers |
| 2006/0089843 | A1 | 4/2006 | Flather |
| 2006/0090131 | A1 | 4/2006 | Kumagai et al. |
| 2006/0230123 | A1 | 10/2006 | Simmons |
| 2006/0282319 | A1 | 12/2006 | Maggio |
| 2006/0288374 | A1 | 12/2006 | Ferris et al. |
| 2007/0089157 | A1 | 4/2007 | Clark |
| 2007/0107021 | A1 | 5/2007 | Angel |
| 2007/0198510 | A1 | 8/2007 | Ebanks |
| 2007/0276726 | A1 | 11/2007 | DiMatteo |
| 2008/0002892 | A1 | 1/2008 | Jelonek et al. |
| 2008/0015933 | A1 | 1/2008 | McKenna et al. |
| 2008/0071594 | A1 | 3/2008 | Morin |
| 2008/0098425 | A1 | 4/2008 | Welch |
| 2008/0167943 | A1 | 7/2008 | O'Neil et al. |
| 2008/0246759 | A1 | 10/2008 | Summers |
| 2008/0255961 | A1 | 10/2008 | Livesey |
| 2008/0306830 | A1 | 12/2008 | Lasa |
| 2008/0310731 | A1 * | 12/2008 | Stojancic et al. ............. 382/195 |
| 2009/0019474 | A1 | 1/2009 | Robotham et al. |
| 2009/0063991 | A1 * | 3/2009 | Baron et al. .................. 715/751 |
| 2009/0064219 | A1 | 3/2009 | Minor |
| 2009/0089830 | A1 | 4/2009 | Chandratillake et al. |
| 2009/0119165 | A1 * | 5/2009 | Cotgreave .............. G06Q 30/02 705/14.56 |
| 2009/0132342 | A1 | 5/2009 | Klinger et al. |
| 2009/0167870 | A1 | 7/2009 | Caleca |
| 2010/0058381 | A1 | 3/2010 | Begeja et al. |
| 2010/0076851 | A1 * | 3/2010 | Jewell, Jr. .................. 705/14.67 |
| 2010/0122286 | A1 | 5/2010 | Begeja et al. |
| 2010/0131385 | A1 * | 5/2010 | Harrang et al. ................ 705/26 |
| 2010/0138478 | A1 * | 6/2010 | Meng ............................ 709/203 |
| 2010/0162288 | A1 | 6/2010 | Huffman |
| 2010/0179874 | A1 * | 7/2010 | Higgins ............. G06K 9/00664 705/14.53 |
| 2010/0228631 | A1 | 9/2010 | Zhang |
| 2010/0299360 | A1 * | 11/2010 | Yi .......................... G06Q 30/02 707/776 |
| 2011/0093336 | A1 * | 4/2011 | Calabria ..................... 705/14.53 |
| 2011/0106618 | A1 | 5/2011 | Ben-Moshe |
| 2011/0142417 | A1 | 6/2011 | Wilson et al. |
| 2011/0251898 | A1 * | 10/2011 | Scott et al. ................. 705/14.62 |
| 2011/0264523 | A1 * | 10/2011 | Scott et al. ................. 705/14.52 |
| 2011/0264528 | A1 * | 10/2011 | Whale ........................ 705/14.58 |
| 2011/0270685 | A1 * | 11/2011 | Marks et al. ............... 705/14.66 |
| 2011/0307481 | A1 * | 12/2011 | Leite et al. .................... 707/728 |
| 2011/0321083 | A1 | 12/2011 | Rouse et al. |
| 2012/0011550 | A1 | 1/2012 | Holland et al. |
| 2012/0022947 | A1 | 1/2012 | Esprey |
| 2012/0054791 | A1 * | 3/2012 | Millar ...................... H04N 5/76 725/32 |
| 2012/0150631 | A1 * | 6/2012 | Root .................. G06Q 30/0251 705/14.49 |
| 2012/0158476 | A1 * | 6/2012 | Neystadt ............... G06Q 50/01 705/14.16 |
| 2012/0232956 | A1 * | 9/2012 | Dilip ...................... G06Q 30/02 705/7.33 |
| 2012/0266197 | A1 | 10/2012 | Andrews, II et al. |
| 2012/0297417 | A1 | 11/2012 | Philpott et al. |
| 2012/0311649 | A1 * | 12/2012 | Patten .................... G06Q 30/02 725/97 |
| 2013/0019261 | A1 | 1/2013 | Huber et al. |
| 2013/0297623 | A1 * | 11/2013 | Niyogi .................... G06Q 10/00 707/751 |
| 2015/0206348 | A1 | 7/2015 | Koreeda |
| 2016/0301986 | A1 | 10/2016 | Bonvolanta |
| 2017/0272823 | A1 | 9/2017 | White |
| 2017/0364950 | A1 * | 12/2017 | Elvekrog ........... G06Q 30/0241 |

* cited by examiner

100

200

METHOD AND APPARATUS FOR TARGETED ADVERTISING

FIELD OF THE DISCLOSURE

The present disclosure relates to a method and apparatus for targeted advertising.

BACKGROUND

Some merchants promote consumer products on broadcast television by way of advertisements interleaved with popular television programs. Merchants have also promoted their products by arranging agreements with celebrities to promote their products. In other instances, merchants promote products in a subtle manner by positioning products (e.g., soda cans) in a noticeable background setting of a television program.

DETAILED DESCRIPTION

Figure 1:
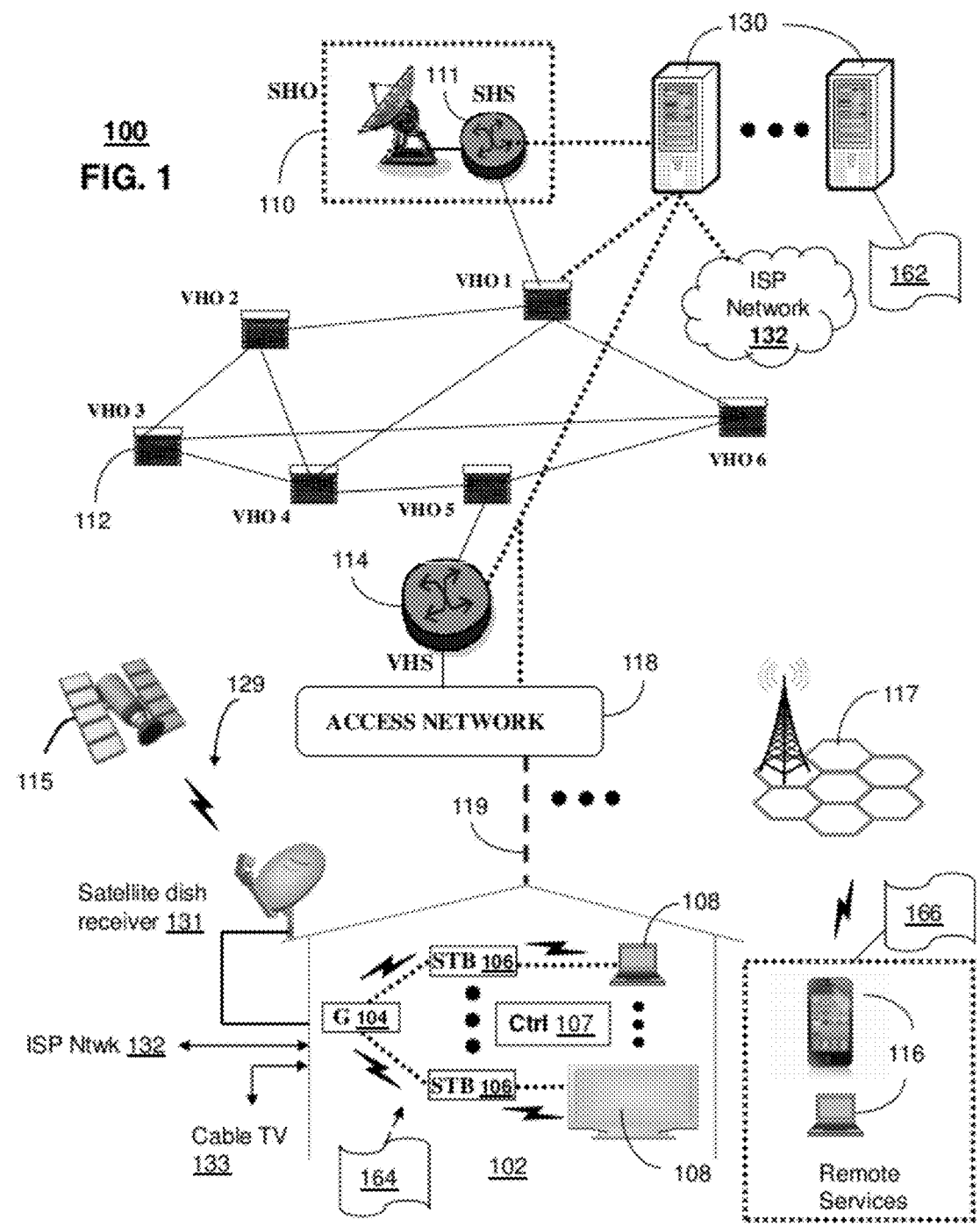
FIGS. 1-2 depict illustrative embodiments of communication systems that provide media services.

The present disclosure describes, among other things, illustrative embodiments for targeted advertising by identifying subscribers (followers) who directly or indirectly are influenced by other subscribers (leaders). The present disclosure contemplates determining a behavior of leaders and/or followers and known characteristics of each group to perform targeted advertising more effectively.

One embodiment of the present disclosure includes a method for identifying a subscriber leader, identifying a plurality of subscriber followers who track activities of the subscriber leader, and detecting a behavioral pattern from media content consumed at a first plurality of devices of the subscriber leader and from media content transmitted by at least one of the first plurality of devices of the subscriber leader to a second plurality of devices of the plurality of subscriber followers. The method can further include detecting a first request for first media content from a first device of the first plurality of devices of the subscriber leader, identifying in the first media content a first substitutable advertisement product, and substituting the first substitutable product in the first media content with a first advertisement product selected according to the detected behavioral pattern to generate updated first media content, and transmitting the updated first media content to the first device. The method can also include detecting a second request to transmit second media content from at least one of the first plurality of devices of the subscriber leader to the second plurality of devices of the plurality of subscriber followers, identifying in the second media content a second substitutable advertisement product, substituting the second substitutable product in the second media content with a second advertisement product selected according to the detected behavioral pattern to generate updated second media content, and transmitting the updated second media content to the second plurality of devices of the plurality of subscriber followers.

One embodiment of the present disclosure includes a device having a memory coupled to a controller. The controller can be operable to determine a behavioral pattern of at least one of a subscriber leader and a plurality of subscriber followers who track activities of the subscriber leader. The controller can be further operable to detect a first request to transmit first media content from a first device of a first plurality of devices of the subscriber leader to a second plurality of devices of the plurality of subscriber followers, identify in the first media content a first substitutable product, substitute the first substitutable product in the first media content with a first advertisement product supplied by a first advertiser. The first advertisement product can be selected according to the behavioral pattern to generate updated first media content, and transmit the updated first media content to the second plurality of devices of the plurality of subscriber followers.

One embodiment of the present disclosure includes a computer-readable storage medium having computer instructions to identify a subscriber leader, identify a plurality of subscriber followers that track activities of the subscriber leader, detect from the activities of the subscriber leader a behavioral pattern that influences a product consumption behavior of the plurality of subscriber followers, receive a request for media content from at least one of the plurality of devices of the plurality of subscriber followers, substitute a substitutable product in the media content with an advertisement product selected according to the detected behavioral pattern to generate updated media content, and transmit the updated media content to the at least one of the plurality of devices of the plurality of subscriber followers.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to other present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116. Communication system 100 can also provide for all or a portion of the computing devices 130 to function as a server that performs targeted advertising directed to subscriber leaders and subscriber followers (herein referred to as server 130). The server 130 can use common computing and communication technology to perform function 162, which can include among things, identifying subscriber leaders and subscriber followers, observing the behavior of either or both groups, assessing a commercial value of each group, and/or modifying media content with targeted advertisements selected according to the observed behavior of these groups. Server 130 can perform other functions as will be described below. The media processors 106 and wireless communication devices 116 can be adapted with software functions 164 and 166, respectively, to utilize the services of server 130.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the present disclosure.

Figure 2:
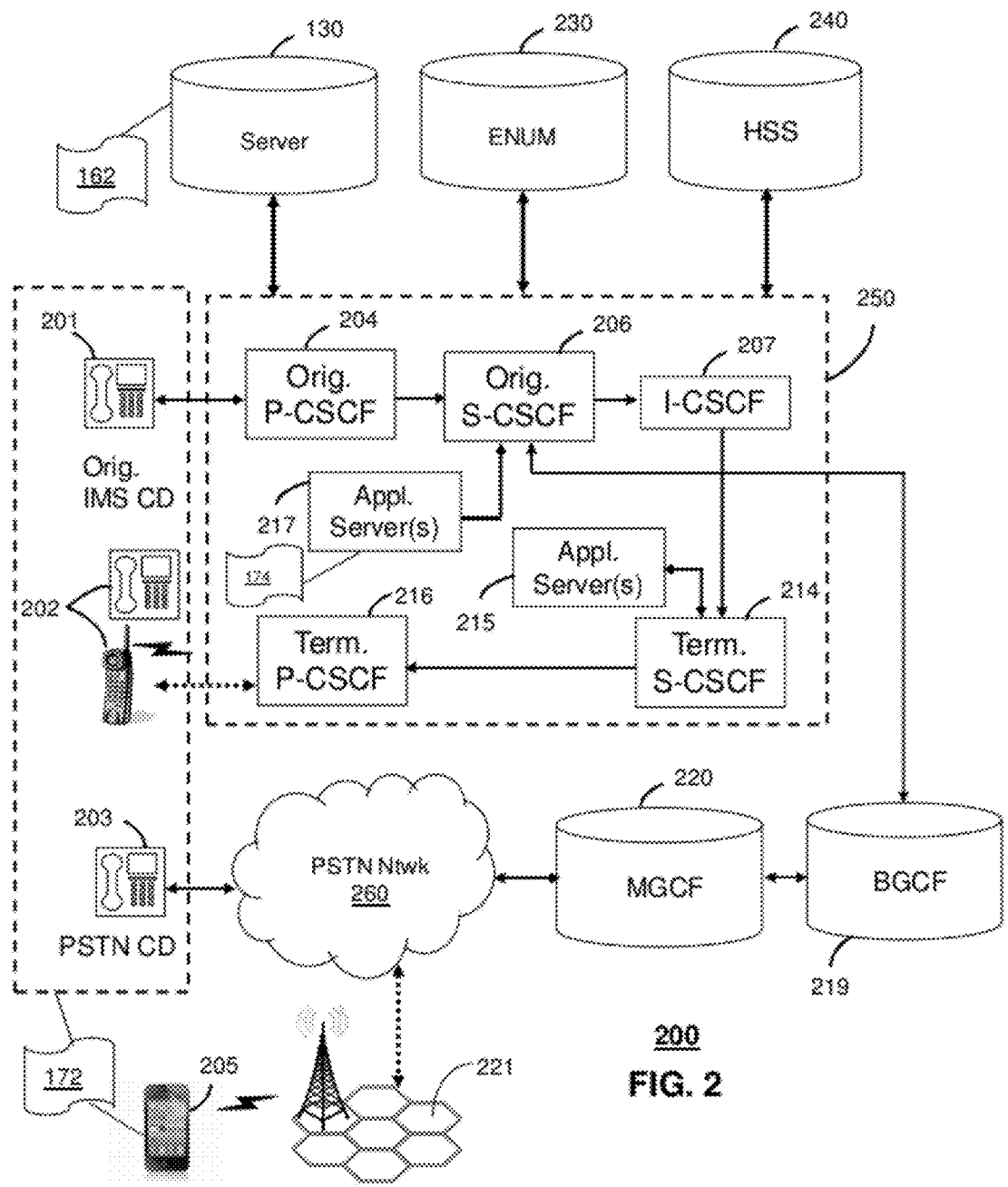

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 221 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250.

The server 130 of FIG. 1 can be operably coupled to the second communication system 200 for purposes similar to those described above. It is further contemplated by the present disclosure that server 130 can perform function 162 and thereby provide targeted advertising services to the CDs 201, 202, 203 and 205 of FIG. 2. CDs 201, 202, 203 and 205, which can be adapted with software to perform function 172 to utilize the services of the server 130. It is further contemplated that the server 130 can be an integral part of the application server(s) 217 performing function 174, which can be substantially similar to function 162 and adapted to the operations of the IMS network 250.

Figure 3:
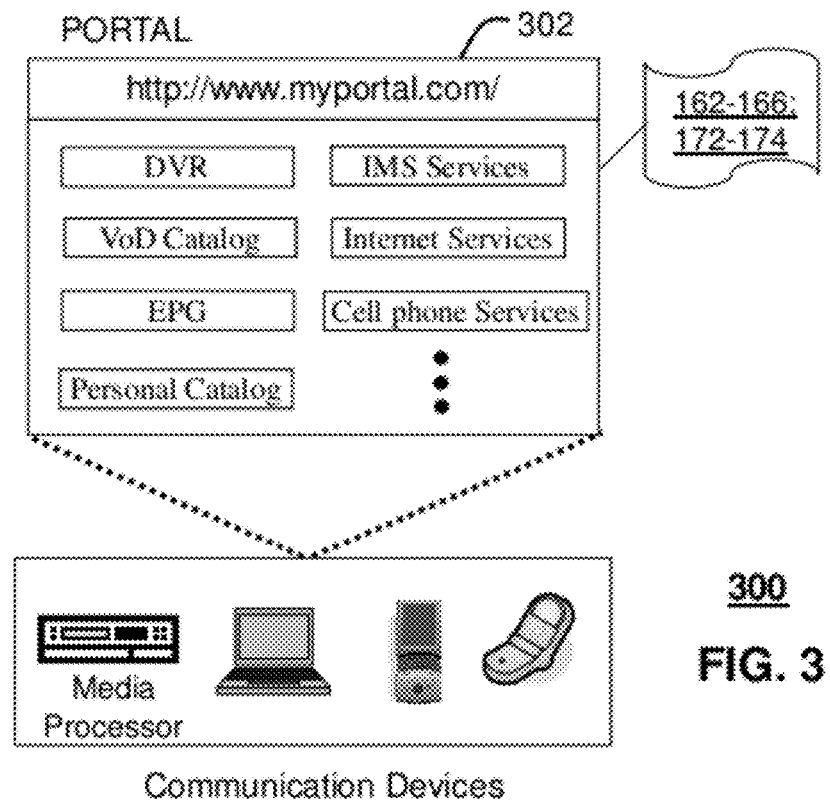
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications 162-166 and 172-174 to adapt these applications as may be desired by subscribers and service providers of communication systems 100-200.

Figure 4:
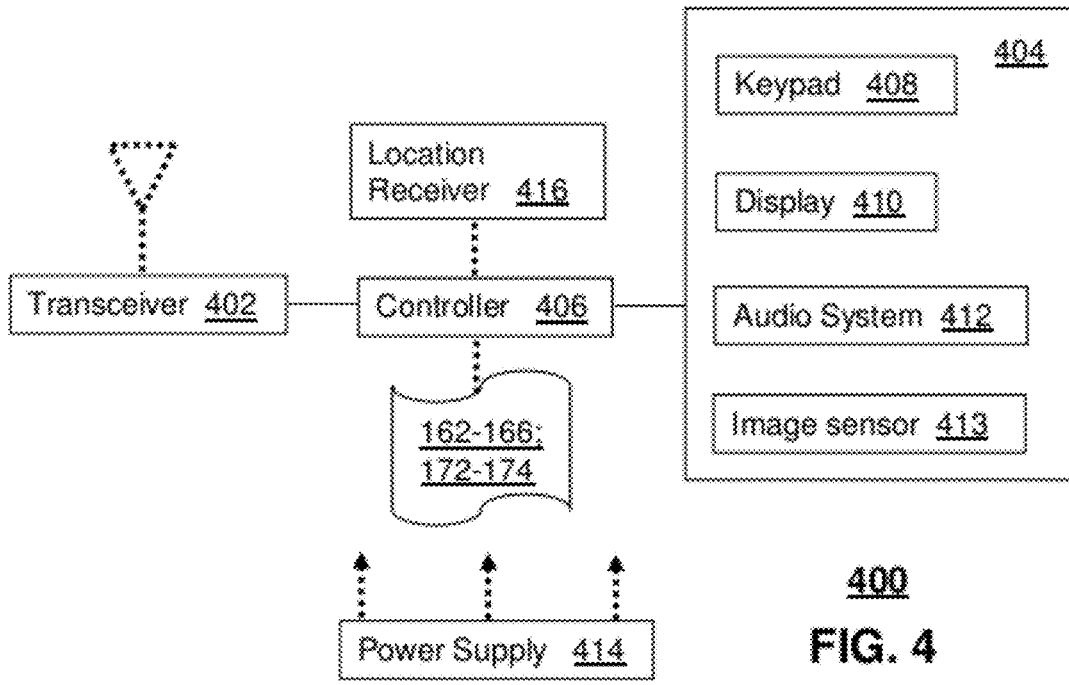
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is contemplated by the present disclosure that the communication device 400 shown in FIG. 4 or portions thereof can serve as a representation of one or more of the devices of communication systems 100-200. It is further contemplated that the controller 406 can be adapted in various embodiments to perform the functions 162-166 and 172-174, respectively.

Figure 5:
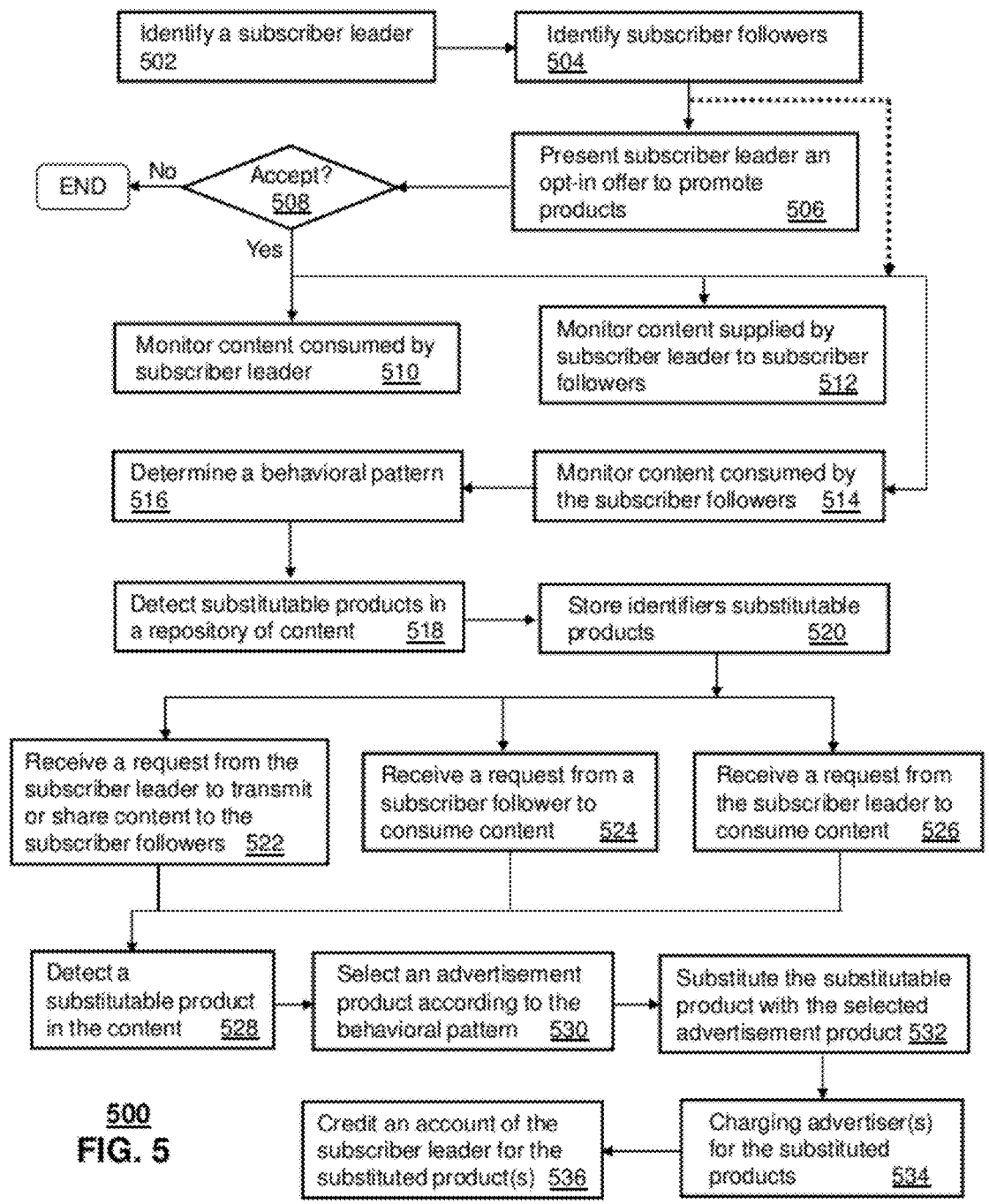
FIG. 5 depicts an illustrative embodiment of a system.

FIG. 5 depicts an illustrative method 500 that operates in portions of the devices of FIGS. 1-5. Method 500 can begin with step 502 in which the server 130 identifies in steps 502 and 504 a subscriber leader and corresponding subscriber followers. In the present context a subscriber leader can represent a subscriber of the communication systems of FIGS. 1-3 which can draw an interest from other subscribers (referred to herein as subscriber followers) to track the activities of the subscriber leader. In one embodiment, subscriber followers can choose to expressly identify themselves as followers and subscribe to a service to proactively follow the activities of the subscriber leader much like subscribers of social network services such as Twitter®. In another embodiment, subscriber followers can on their own accord follow the activities of a subscriber leader by way of interactive communications (landline calls, cellular calls, email, SMS or MMS messaging), browsing on the Internet for news about the subscriber leader, acquiring access to the subscriber leader's personal media content (e.g., personal videos, pictures, music), monitoring the behavior of a subscriber leader's blog web page, or joining as members of the subscriber leader's social network page (e.g., FaceBook®). Other suitable techniques in which subscriber followers can directly or indirectly track the activities of the subscriber leader are contemplated by the present disclosure.

Server 130 can be adapted to identify a subscriber leader by direct membership subscription initiated by subscriber followers to track the activities of the subscriber leader (such as is the case for members of Twitter®, FaceBook®, and so on). In cases where a subscription process is not available, the server 130 can also be adapted to monitor network traffic to identify frequent communications between subscriber leaders and followers (email, SMS or MMS, landline or mobile calls), one-way proactive monitoring of the subscriber leader by subscriber followers (e.g., Internet browsing, blog browsing, etc.), or one-way communications directed from subscriber leaders to subscriber followers (e.g., forwarding or publishing media content that is directed to subscriber followers).

In one embodiment subscriber leaders and subscriber followers can be subscribers of the same service provider of communication and media services. In another embodiment subscriber leaders and subscriber followers can be subscribed to services from different service providers. In this instance, the service providers can share or provide access to network traffic of each other's subscribers to enhance detection of subscriber leaders and followers, or such information can be indirectly determined from cross-over traffic between the networks of the service providers.

In step 506, the subscriber leader can be presented an opt-in offer from the service provider to promote products or services of advertisers. The opt-in offer can offer the subscriber leader discounted or free media services or monitory rewards for products promoted by way of monitored activities of the subscriber leader. The opt-in offer can present to the subscriber leader terms and conditions for the discounted services and/or monetary rewards, as well as it may describe the extent and manner to which the subscriber leader and/or followers will be monitored by the server 130 to conduct targeted advertising directed to the subscriber leader and the subscriber followers. If the subscriber leader rejects the offer, then targeted advertising is not performed by the server 130. If, on the other hand, the subscriber leader accepts the offer, then the server 130 can begin to monitor activities of these parties.

For example, in step 510, the server 130 can monitor media content consumed by the subscriber leader. This step can represent a subscriber leader that consumes audio content (music, radio), video (VoD), email, SMS or MMS messages from subscriber followers or third party sources, Internet browsing of content, and so on. In step 512, the server 130 can monitor media content supplied by the subscriber leader to the subscriber followers. This step can represent, for example, a subscriber leader that shares content with subscriber followers by direct transfers or access to a web page of a social network (similar to FaceBook®). The shared content can be audio content, video content, pictures, etc. This step can also represent communications with subscriber followers such as voice communications, SMS or MMS messages, email, text messaging via a web page of a social network (e.g., Twitter®, FaceBook®).

The server 130 can also monitor, in step 514, content consumed by the subscriber followers. The content consumed by the subscriber followers can be content generated by the subscriber leader or content requested by the subscriber followers from a source other than the subscriber leader. In this embodiment, content is broadly contemplated. For instance, content can include audio content, video content, still image content, text and/or audio messages, and so on.

Based on the activities monitored in steps 510-512, the server 130 can be adapted in step 516 to determine a behavioral pattern. The behavioral pattern can represent a detected behavioral pattern of the subscriber leader, a behavioral pattern of the subscriber followers, or combinations thereof. To determine the influence of the subscriber leader on the subscriber followers, the server 130 can be adapted to perform correlation analysis between the content consumed by the subscriber leader (step 510), the content generated by the subscriber leader (step 512), and the content consumed by the subscriber followers (step 514). For instance, the server 130 can determine a high correlation between the subscriber leader and subscriber followers in the case of content consumed by the subscriber followers that was generated by the subscriber leader. The server 130 can also determine the volume of content generated by the subscriber leader, the frequency that the subscriber leader generates content, and the degree that the subscriber followers consume this content.

In the case of content consumed by subscriber followers that is not generated by the subscribe leader, the server 130 can be adapted to determine whether the content consumed by the subscriber followers is correlated with the content generated by the subscriber leader. A high correlation would indicate that the subscriber leader has a high degree of influence on the subscriber followers. Such a correlation can be determined from similarities in the content generated by the subscriber leader and the content consumed by the subscriber followers. For example, the subscriber leader may post a blog in which the subscriber leader encourages its readers to follow Star Trek episodes. The subscriber leader can also suggest dates to view episodes to engage in discussions about the episode. The server 130 can detect the posted messages in the blog and correlate actions taken by the subscriber followers that indicate the subscriber followers are following the suggestions of the subscriber leader.

In addition to the above embodiments for describing a behavioral pattern of the subscriber leader and the subscriber followers, the server 130 can assess a demographic profile of the subscriber leader and the subscriber followers from service accounts of each subscriber (e.g., age, gender, services subscribed, family size, income, credit, etc.). The server 130 can, for example, assess that the subscriber followers are within a particular age group and income bracket. The server 130 can also determine from the consumption behavior of the subscriber leader and subscriber followers a psychographic profile of the subscribers. The psychographic profile can identify biases (likes and dislikes) and traits of the subscribers, which can be indicative of a potential spending behavior relative to classes of products or services. The behavioral pattern can also indicate how the subscriber leader influences the consumption behavior of the subscriber followers.

The behavioral patterns described above can be determined by the server 130 using present and future statistical techniques as they are made available. Once behavioral patterns have been assessed, the server 130 can begin to perform targeted advertising with the subscriber leader and/or subscriber followers. In preparation for targeted advertising, the server 130 can be adapted to preprocess media content that it distributes. The server 130 can for example identify elements of a media program that may be marketable and which can be substituted with other marketable products depending on the biases determined from the behavioral patterns detected in step 516.

Figure 6:
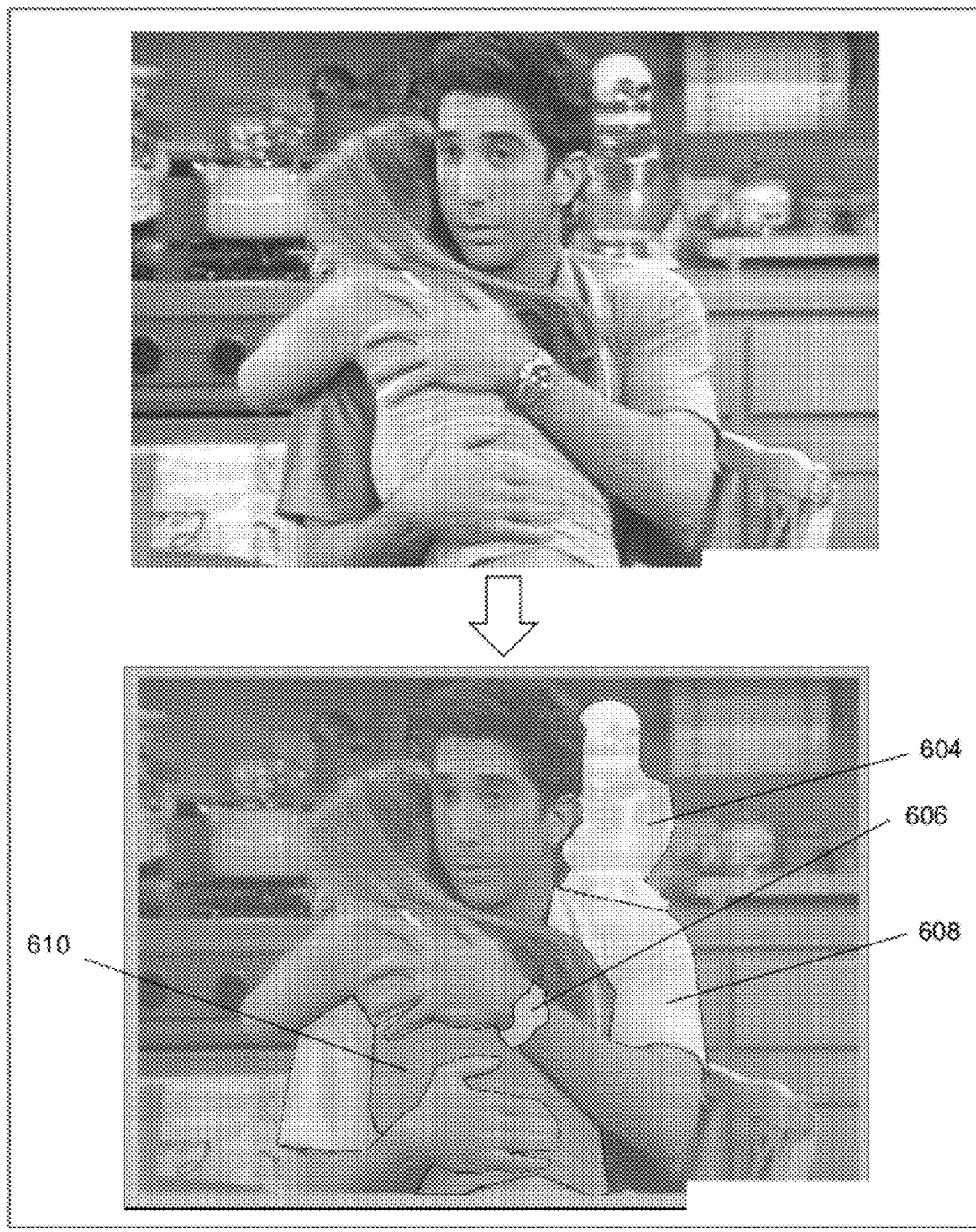
FIG. 6 depicts an illustrative embodiment of a method operating in portions of the systems described in FIGS. 1-5.

For example, suppose the server 130 finds an episode of the TV program, "Friends", such as shown in FIG. 6. The server 130 can analyze frames in the episode and identify with image processing techniques items such as a blender 604, a watch 606, male apparel 608, and female apparel 610. Using image processing technology the contours of these items can be identified in step 518, and associated with identifiers that can be recorded in step 520 to enable the server 130 promptly determine candidate products which can be substituted with products of advertisers in subsequent scheduled releases of the program or upon request (VoD) by subscriber leaders or followers. The default setting of such media content is to maintain the identified items as originally authored by the producers of the media program. In addition to substituting items in a media program, the server 130 can be adapted to insert advertisements in scheduled advertisements slots that are tailored to the subscriber leader and subscriber followers based on the detected behavior(s) of step 516.

The server 130 can be adapted to receive a request from the subscriber leader to transmit and/or share content with the subscriber followers. If the content being transmitted or shared represent content stored in the repository described in step 518, then the server 130 can retrieve the identifiers stored in step 520 to promptly identify potential substitutable products in the content. If, on the other hand, the content being transmitted or shared is random content generated by the subscriber leader, then the server 130 can perform the image processing analysis described above to identify substitutable products, and can generate identifiers that the server 130 can store for future identification of these substitutable products.

In step 528, the server 130 can be adapted to detect the substitutable products in the content to be transmitted or shared by retrieving the identifiers described above. The server 130 can then determine a product type for each substitutable product detected. For example, the server 130 can detect a substitutable product that is a soda can, a kitchen appliance, and so on. Based on the bias factors determined from the detected behavioral patterns of the subscriber leader and subscriber followers, the server 130 can select in step 520 advertisement products from a pool of advertisement products that match the detected product types. In step 532, the server 130 can be adapted to substitute the detected substitutable product with a selected advertisement product using image processing technology. If the content being distributed by the subscriber leader is video content and the substitutable product is not stationary, then the server 130 can use image processing technology to adapt the advertisement product to the movements of the substitutable product so that it appears as a product that was part of the originally authored content.

The foregoing process can be adapted to process content such as a request from a subscriber follower in step 524 or a request from the subscriber leader in step 526 to consume content. The requested content from either party can be processed so that identifiable substitutable products are replaced with advertisement products that match a product type of the substitutable product and that match the interests of the parties as determined from their respective behavioral patterns. As noted earlier, intermediate advertisements presented between scheduled advertisements can also be substituted with targeted advertisements that conform to the detected biases determined from the behavioral patterns.

When content has been updated with targeted advertisements as described above for either the subscriber leader or subscriber followers, the server 130 can proceed to step 534 where it can be adapted to charge advertisers who supplied the advertised products with a fee. The fee charged can be based on a prearranged agreement between the service provider of server 130 and advertisers. The fee can be charged each time updated content is distributed, or when a certain volume of updated content distributions is reached. As an incentive to the subscriber leader for opting into targeted advertising, the server 130 can be adapted to credit an account of the subscriber leader each time updated content distributions take place or when they occur in bulk. The credit given can represent a monetary reward or discount in media services supplied by the service provider(s) of communication systems 100-200. Such rewards can be an incentive for subscriber leaders to make an effort to draw as large a subscriber follower base as possible so that the rewards are significant.

Upon reviewing the aforementioned embodiments, it would be evident to an artisan with ordinary skill in the art that said embodiments can be modified, reduced, or enhanced without departing from the scope of the claims described below. For example, there can be instances where an opt-in offer is not a necessary condition to enable the services of the server 130. For example, subscribers of communication systems 100-200 may already have accepted in their service contract that the service provider can monitor their activities. In this embodiment, method 500 can be adapted to skip steps 506-508. In another embodiment, if state or federal laws allow a service provider to monitor its subscribers without consent, then steps 506 and 508 can also be avoided. Method 500 can also be adapted for substitution of audio segments, still image segments, or any other substitutable form of identifiable media content. Method 500 can also be adapted to charge advertisers fees that are based on a marketable value determined for the subscriber leader. The marketable value of the subscriber leader can be determined, for example, based on the population size of subscriber followers, their respective growth rate, and the demographic profile of such subscribers.

Other embodiments are contemplated by the present disclosure.

Figure 7:
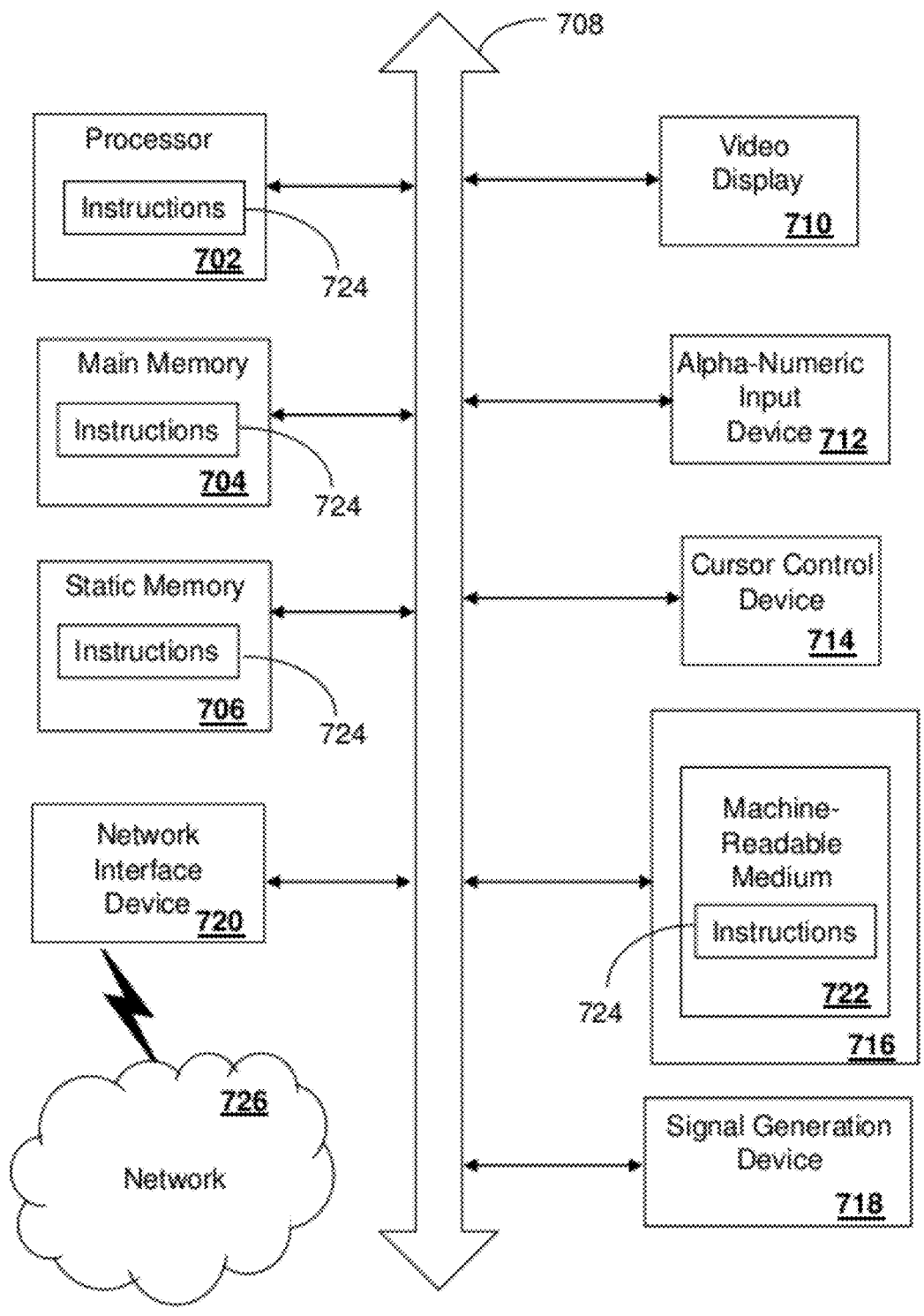
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods discussed above. One or more instances of the machine can operate, for example, as the server 130, media processor 106, portable devices 108, and other devices of FIGS. 1-2. It is further contemplated that server 130 can represent a combination of computing devices distributed throughout the communication systems of FIGS. 1-3. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the present disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

identifying, by a processing system including a processor, an individual subscriber to a communication service as a subscriber leader, wherein the identifying the subscriber leader is performed electronically via a network;

transmitting, by the processing system, a message from a provider of the communication service to equipment associated with the subscriber leader, the message comprising an opt-in offer to monitor consumption and transmission of media content by the equipment associated with the subscriber leader, wherein the transmitting the message is performed electronically via the network;

identifying, by the processing system responsive to an acceptance of the opt-in offer, a plurality of subscriber followers who track activities of the subscriber leader, wherein the identifying the plurality of subscriber followers is performed electronically via the network, wherein the plurality of subscriber followers are identified in accordance with interactions between the subscriber leader and the plurality of subscriber followers, wherein the interactions are performed electronically via the network, and wherein the interactions performed electronically via the network are identified electronically by the processing system;

detecting, by the processing system, a detected behavioral pattern, wherein the detecting the detected behavioral pattern is based on monitoring media content consumed at the equipment associated with the subscriber leader and media content transmitted by the equipment associated with the subscriber leader to a plurality of subscriber follower devices respectively associated with the plurality of subscriber followers, wherein the detected behavioral pattern comprises a behavioral pattern of the subscriber leader or a behavioral pattern of the subscriber leader and the plurality of subscriber followers, wherein the behavioral pattern of the subscriber leader influences a product consumption behavior of the plurality of subscriber followers, and wherein the detecting the detected behavioral pattern is performed electronically via the network;

detecting, by the processing system, a first request from the equipment of the subscriber leader for first media content, wherein an element of the first media content represents a marketable product comprising a substitutable product, and wherein the detecting the first request is performed electronically via the network;

identifying, by the processing system, in the first media content a first substitutable product;

substituting, by the processing system, the first substitutable product in the first media content with a first advertisement product selected according to the detected behavioral pattern to generate updated first media content;

transmitting, by the processing system, the updated first media content to the equipment associated with the subscriber leader, wherein the transmitting the updated first media content is performed electronically via the network;

detecting, by the processing system, a second request from the equipment of the subscriber leader to transmit second media content to the plurality of subscriber follower devices, the second media content comprising video program content, wherein the detecting the second request is performed electronically via the network;

identifying, by the processing system, in the second media content a second substitutable product;

substituting, by the processing system, the second substitutable product in the second media content with a second advertisement product selected according to the detected behavioral pattern to generate updated second media content, the second substitutable product being substituted with the second advertisement product by removing an image, corresponding to the second substitutable product, from the video program content and by inserting into the video program content, in place of the image that had been removed, an image corresponding to the second advertisement product, wherein the image corresponding to the second advertisement product is inserted into the video program content in a manner that adapts to movements of an item worn by an actor in the video program content, as the movements of the item had existed in the video program content prior to the substituting; and transmitting, by the processing system, the updated second media content to the plurality of subscriber follower devices, wherein the transmitting the updated second media content is performed electronically via the network;

wherein the first media content prior to the substituting corresponds to an original media program.

2. The method of claim 1,
wherein the opt-in offer comprises an offer to monitor the media content consumed at the equipment associated with the subscriber leader and the media content transmitted by the equipment associated with the subscriber leader to the plurality of subscriber follower devices;
wherein the acceptance of the opt-in offer is received from the equipment associated with the subscriber leader; and further comprising:
monitoring, by the processing system, the media content consumed at the equipment associated with the subscriber leader and the media content transmitted by the equipment associated with the subscriber leader to the plurality of subscriber follower devices responsive to the acceptance of the opt-in offer.

3. The method of claim 1, wherein the first substitutable product has a first product type, and further comprising:
identifying, by the processing system, the first product type; and
selecting, by the processing system, the first advertisement product according to the first product type and the detected behavioral pattern.

4. The method of claim 1, wherein the second substitutable product has a second product type, and further comprising:
identifying, by the processing system, the second product type; and
selecting, by the processing system, the second advertisement product according to the second product type and the detected behavioral pattern.

5. The method of claim 1, further comprising transmitting, by the processing system, the updated second media content to a communication system of a social network communicatively coupled to the plurality of subscriber follower devices.

6. The method of claim 1, further comprising:
receiving, by the processing system, the first media content;
processing, by the processing system, the first media content to determine that at least a portion of the first media content represents the marketable product;
associating, by the processing system, the first substitutable product with an identifier; and
responsive to receiving the first request, identifying, by the processing system, the first substitutable product in the first media content according to the identifier.

7. The method of claim 1,
wherein the first advertisement product is supplied by a first advertiser of a plurality of advertisers;
wherein the second advertisement product is supplied by a second advertiser of the plurality of advertisers; and further comprising:
charging, by the processing system, the first advertiser a first fee for promoting the first advertisement product; and
charging, by the processing system, the second advertiser a second fee for promoting the second advertisement product.

8. The method of claim 7, further comprising determining, by the processing system, the first and second fees according to a marketable score assigned to the subscriber leader.

9. The method of claim 8, further comprising determining, by the processing system, the marketable score from a total number of the plurality of subscriber followers, a growth rate of subscriber followers tracking activities of the subscriber leader, a value of media content consumed by the subscriber leader, or a value of media content consumed by the subscriber followers.

10. The method of claim 1, wherein the detected behavioral pattern corresponds to a detected bias for a product type.

11. The method of claim 1, further comprising crediting, by the processing system, an account of the subscriber leader, in accordance with the acceptance of the opt-in offer, resulting from the processing system transmitting the updated first media content or the updated second media content.

12. A device, comprising:
a processing system including a processor; and
a memory that stores executable instructions that, when executed by the processing system, facilitate performance of operations, the operations comprising:
transmitting a message from a communication service provider to equipment associated with an individual identified as a subscriber leader by the communication service provider, the message comprising an opt-in offer to monitor activities of the subscriber leader wherein the transmitting the message is performed electronically via a network;
responsive to an acceptance of the opt-in offer, determining a detected behavioral pattern, wherein the detected behavioral pattern comprises a behavioral pattern of the subscriber leader or a behavioral pattern of the subscriber leader and a plurality of subscriber followers who track the activities of the subscriber leader, wherein the behavioral pattern of the subscriber leader influences a product consumption behavior of the plurality of subscriber followers wherein the plurality of subscriber followers are identified in accordance with interactions between the subscriber leader and the plurality of subscriber followers, wherein the interactions are performed electronically via the network, wherein the interactions performed electronically via the network are identified electronically by the processing system, and wherein the determining the detected behavioral pattern is performed electronically via the network;
detecting a first request from the equipment associated with the subscriber leader to transmit first media content to a plurality of subscriber follower devices respectively associated with the plurality of subscriber followers, wherein an element of the first media content represents a marketable product comprising a substitutable product, wherein the first media content comprises video program content, and wherein the detecting the first request is performed electronically via the network;
identifying in the first media content a first substitutable product;
substituting the first substitutable product in the first media content with a first advertisement product supplied by a first advertiser, wherein the first advertisement product is selected according to the detected behavioral pattern to generate updated first media content, the first substitutable product being substituted with the first advertisement product by removing an image, corresponding to the first substitutable product, from the video program content and by inserting into the video program content, in place of the image that had been removed, an image corresponding to the first advertisement product, wherein the image corresponding to the first advertisement product is inserted into the video program content in a manner that adapts to movements of an item worn by an actor in the video program content, as the movements of the item had existed in the video program content prior to the substituting; and transmitting the updated first media content to the plurality of subscriber follower devices, wherein the transmitting the updated first media content is performed electronically via the network;

wherein the first media content prior to the substituting corresponds to an original media program.

13. The device of claim 12, wherein the operations further comprise:
    detecting a second request from the equipment associated with the subscriber leader for second media content;
    identifying in the second media content a second substitutable product;
    substituting the second substitutable product in the second media content with a second advertisement product supplied by a second advertiser, wherein the second advertisement product is selected according to the detected behavioral pattern, to produce updated second media content; and
    transmitting the updated second media content to the equipment associated with the subscriber leader.

14. The device of claim 12, wherein the opt-in offer is presented at the equipment associated with the subscriber leader; and wherein the operations further comprise receiving the acceptance of the opt-in offer.

15. The device of claim 12, wherein the operations further comprise identifying the first substitutable product from an image contour of the first substitutable product in a frame of the video program content.

16. The device of claim 15, wherein the first substitutable product is identified using a repository of image content.

17. The device of claim 12, wherein the operations further comprise identifying the first substitutable product from information received with the first media content.

18. The device of claim 15,
    wherein the substituting comprises inserting the image corresponding to the first advertisement product in a location of the image contour.

19. A non-transitory machine-readable storage medium comprising executable instructions that, when executed by a processing system including a processor of a communication service provider, facilitate performance of operations, the operations comprising:
    identifying an individual as a subscriber leader, wherein the identifying the subscriber leader is performed electronically via a network;
    transmitting a message regarding the identifying of the subscriber leader from the communication service provider to equipment associated with the subscriber leader, the message comprising an opt-in offer to monitor activities of the subscriber leader, wherein the transmitting the message is performed electronically via the network;
    identifying a plurality of subscriber followers that track the activities of the subscriber leader, wherein the identifying the plurality of subscriber followers is performed electronically via the network, wherein the plurality of subscriber followers are identified in accordance with interactions between the subscriber leader and the plurality of subscriber followers, wherein the interactions are performed electronically via the network, and wherein the interactions performed electronically via the network are identified electronically by the processing system;
    responsive to an acceptance of the opt-in offer, detecting from the activities of the subscriber leader a detected behavioral pattern that influences a product consumption behavior of the plurality of subscriber followers, wherein the detecting the detected behavioral pattern is performed electronically via the network;
    receiving a request for media content from a subscriber follower device associated with any of the plurality of subscriber followers, wherein an element of the media content represents a marketable product comprising a substitutable product, and wherein the media content comprises video program content, and wherein the receiving the request is performed electronically via the network;
    substituting the substitutable product in the media content with an advertisement product selected according to the detected behavioral pattern to generate updated media content, the substitutable product being substituted with the advertisement product by removing an image, corresponding to the substitutable product, from the video program content and by inserting into the video program content, in place of the image that had been removed, an image corresponding to the advertisement product, wherein the image corresponding to the advertisement product is inserted into the video program content in a manner that adapts to movements of an item worn by an actor in the video program content, as the movements of the item had existed in the video program content prior to the substituting; and
    transmitting the updated media content to the subscriber follower device, wherein the transmitting the updated media content is performed electronically via the network;
    wherein the media content prior to the substituting corresponds to an original media program.

20. The method of claim 1, wherein the item worn by the actor comprises male apparel, female apparel, a watch, or a combination thereof.

* * * * *